April 10, 1951 J. J. WHARAM ET AL 2,548,507
REAR TORSION SPRING SUSPENSION
Filed Dec. 29, 1945 2 Sheets-Sheet 1

J. J. WHARAM
J. J. FELTS
INVENTORS

BY
ATTORNEYS.

April 10, 1951     J. J. WHARAM ET AL     2,548,507
REAR TORSION SPRING SUSPENSION
Filed Dec. 29, 1945     2 Sheets-Sheet 2
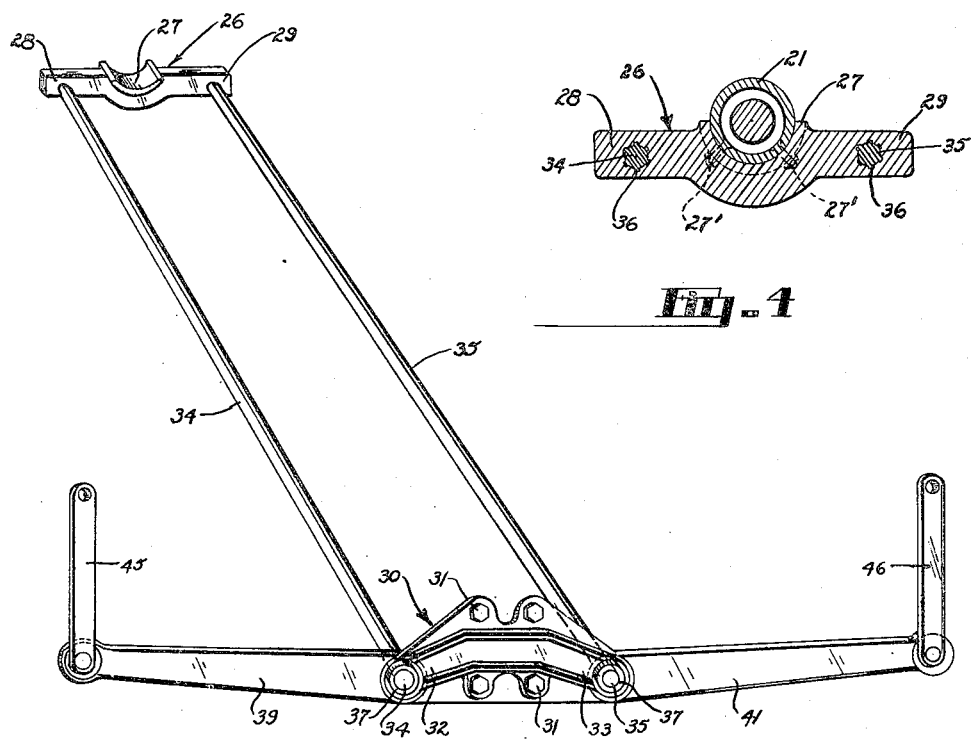
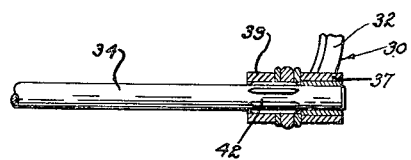
J. J. WHARAM
J. J. FELTS
INVENTORS.
BY *Edwin C. McRae*
*Robert G. Harris*
*John R. Faulkner*
*Thomas H. Oster*
ATTORNEYS.

Patented Apr. 10, 1951

2,548,507

UNITED STATES PATENT OFFICE 2,548,507

REAR TORSION SPRING SUSPENSION

John J. Wharam, Dearborn, and Jerome J. Felts, Pontiac, Mich., assignors to Ford Motor Company, Dearborn, Mich., a corporation of Delaware Application December 29, 1945, Serial No. 637,982

4 Claims. (Cl. 280—124)

This invention relates generally to torsion spring suspensions for motor vehicles, and, more particularly, to suspensions utilizing torsion springs for the springing of the rear wheels of motor vehicles.

In the conventional type of automobile chassis, the driving torque is transmitted from the engine to the rear wheels through a propeller shaft, a differential and a pair of axle shafts. The differential and axle shafts are housed within an axle housing extending transversely between the rear wheels. The torque tube encloses the propeller shaft and extends forwardly from the axle housing, being pivotally connected at its forward end to a frame cross member. The axle housing supports a portion of the vehicle load, and the torque tube takes the rear axle torque reaction and also the driving and braking forces. Transverse or longitudinal leaf springs are generally used between the axle housing and the frame for resiliently supporting the latter.

It is an object of the present invention to provide a torsion spring suspension for the rear wheels of a vehicle of the type briefly discussed above in lieu of the conventional transverse or longitudinal leaf springs. In a preferred embodiment, a pair of transversely extending brackets are mounted upon the torque tube and the axle housing, respectively, and support a pair of longitudinally extending torsion springs, one torsion spring being mounted on each side of the torque tube. The torsion springs may be in the form of bars or rods and are anchored at their forward ends to the bracket on the torque tube, and pivotally supported at their rearward ends by the bracket on the axle housing. Outwardly extending levers are rigidly connected to the torsion springs adjacent the rearward ends of the latter, and are connected at their outer ends to the frame of the vehicle adjacent the road wheels. This construction utilizes a minimum of parts and is readily adapted to the conventional chassis construction. It is inexpensive to manufacture and install, and improved riding qualities are achieved.

A further object of the invention is to provide a torsion spring suspension of the type described above in which the suspension can be preassembled as a unit and easily and quickly installed upon a vehicle chassis by making a few simple connections thereto.

Still another object of the invention is to provide a torsion spring suspension for the rear wheels of a vehicle in which the torsion spring is mounted upon the unsprung portion of the chassis, and is operatively connected to the sprung portion of the chassis.

Other objects and advantages of the present invention will be made more apparent as this description proceeds, particularly when considered in connection with the accompanying drawings, in which:

Figure 3 is a plan view of the torsion spring suspension unit before assembly to the vehicle chassis.

Figure 1:
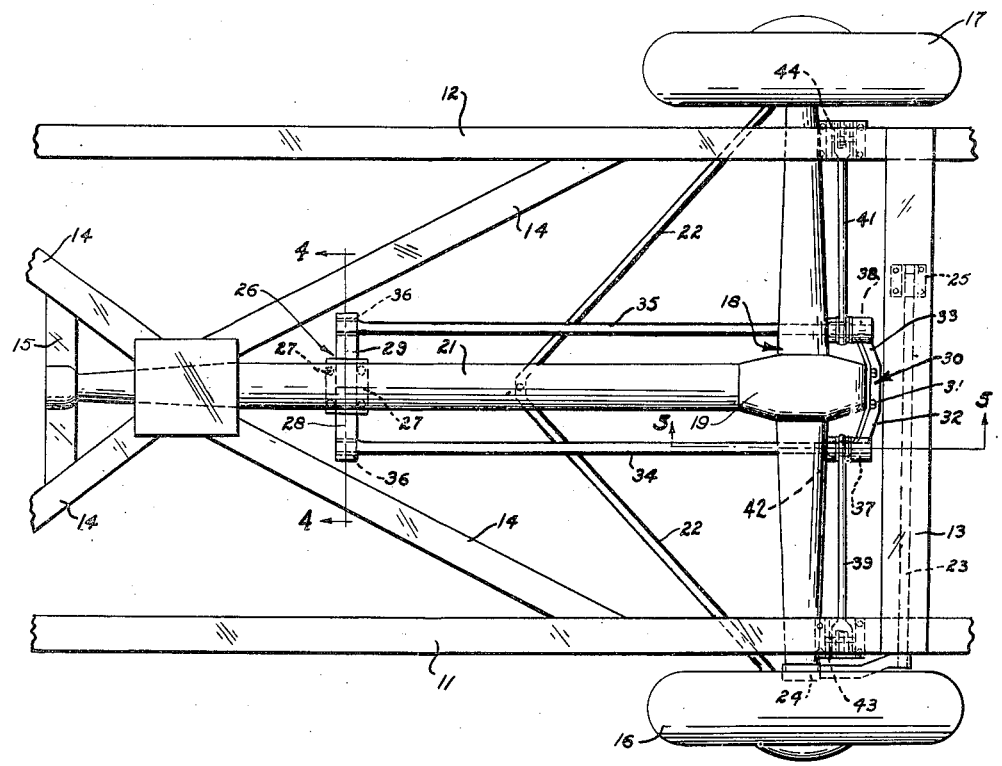
Figure 1 is a plan view of the rearward portion of a motor vehicle chassis equipped with a torsion spring suspension in accordance with the present invention.
Figure 2:
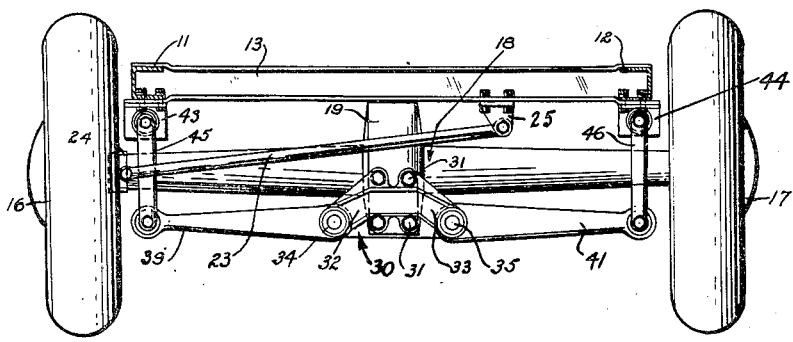
Figure 2 is a rear end elevation of the construction shown in Figure 1.

Figures 4 and 5 are cross sectional views taken substantially on the lines 4—4 and 5—5 of Figure 1.

Referring now more particularly to the drawing, the reference characters 11 and 12 indicate the side members of a vehicle frame having a rear cross member 13, X-frame members 14, and a transverse frame member 15 supported between the X-members. Rear wheels 16 and 17 are mounted at opposite ends of an axle housing 18, the latter containing axle shafts (not shown) connected to the rear wheels. Extending forwardly from the central housing 19 of the axle housing is a torque tube 21, the forward end of which is pivotally connected to the transverse frame member 15. The torque for driving the axle shafts is transmitted from the vehicle engine through a propeller shaft and differential (not shown), respectively housed within the torque tube 21 and the central housing 19. Diagonal brace rods 22 of the conventional type extend between the torque tube and the outer ends of the axle housing. Lateral displacement of the frame relative to the axle housing is prevented by a transversely extending sway bar 23 having one end pivotally connected to bracket 24 on the axle housing and the other end pivotally connected to bracket 25 depending from the rear cross frame member 13.

A front bracket 26 is formed with a central semi-cylindrical flange 27 having a curvature corresponding to that of the torque tube 21. The flange 27 fits against the lower side of the torque tube and is secured thereto by bolts 27'. Extending from opposite sides of the bracket are a pair of side flanges 28 and 29.

A rear bracket 30 fits against the rearward portion of the central housing 19 of the axle housing, and is secured thereto by bolts 31. A pair of side flanges 32 and 33 extend laterally outwardly from the bracket 30.

A pair of longitudinally extending torsion springs 34 and 35 in the form of bars or rods are positioned on opposite sides of the torque tube 21, being generally parallel thereto. The forward ends of the torsion springs 34 and 35 are anchored to the side flanges 28 and 29, respectively, of the front bracket 26 by means of splines 36. At their rearward end, the torsion springs 34 and 35 are journaled in bearings 37 and 38 carried by the side flanges 32 and 33, respectively, of the rear bracket 30.

A pair of transversely extending levers 39 and 41 are rigidly connected at their inner ends to the torsion springs 34 and 35. In the present instance, the connection between the levers and the torsion springs comprise splines 42 located closely adjacent the flanges of the rear bracket 30.

Depending from the side frame members 11 and 12 adjacent the rear wheels are a pair of brackets 43 and 44, respectively. The outer ends of the levers 39 and 41 are connected to the brackets 43 and 44, respectively, by generally vertically extending links 45 and 46. Each link is pivotally connected at its upper end to the bracket on the side frame member and at its lower end to the outer extremity of the lever.

From the foregoing description it will be apparent that the rearward end of each torsion spring is connected by means of a lever and a link to the side frame member of the chassis adjacent one of the rear wheels. Relative movement between each rear wheel and the frame is therefore resiliently resisted by one of the torsion springs.

An advantageous feature of the present construction resides in the fact that the torsion spring suspension can be pre-assembled as a complete unit, and then easily attached to the vehicle chassis. The suspension unit before attachment to the chassis is shown in Figure 3, in which the torsion springs are shown assembled with the front and rear brackets 26 and 30, and with the levers 39 and 41 and the links 45 and 46.

This complete pre-assembled unit can be inserted beneath the vehicle chassis and raised into position. The front and rear bracket 26 and 30 can then be bolted, welded, or otherwise secured to the torque tube 21 and the central housing 19 of the axle housing. If bolts or other removable attaching means are used, the entire assembly can be easily removed for maintenance purposes. After the brackets have been attached to the torque tube and the axle housing, the upper ends of the links 45 and 46 need only be pivotally connected to the brackets 43 and 44, on the frame to complete the assembly. Suitable power means, such as a hydraulic jack, may be used to move the levers relative to the frame to preload the torsion springs and facilitate the attachment of the links to the frame bracket.

It will be understood that the invention is not to be limited to the exact construction shown and described, but that various changes and modifications may be made without departing from the spirit and scope of the invention, as defined in the appended claims.

What is claimed is:

1. In a vehicle having a frame, road wheels on opposite sides of said frame, a rear axle housing and a torque tube projecting forwardly from said rear axle housing, a bracket secured to said torque tube, a second bracket secured to said axle housing, a longitudinally extending torsion spring having its forward end connected to said first mentioned bracket, the rearward end of said torsion spring being pivotally supported by said second mentioned bracket, a lever extending transversely of said frame and having its inner end connected to said torsion spring adjacent the rearward end of the latter, and a generally vertically extending link interconnecting the outer end of said lever and said frame adjacent one of said road wheels.

2. In a vehicle having a frame, road wheels on opposite sides of said frame, a rear axle housing and a torque tube projecting forwardly from said rear axle housing, a bracket secured to said torque tube, a second bracket secured to said axle housing, a pair of longitudinally extending torsion springs positioned on opposite sides of said torque tube and generally parallel thereto, said torsion springs being anchored at their forward ends to said first mentioned bracket and pivotally supported at their rearward ends by said second mentioned bracket, an arm connected to each of said torsion springs adjacent their rearward ends and extending laterally outwardly toward one of said road wheels, and an upright link pivotally connected to the outer end of each of said arms, the upper ends of said links being pivotally connected to said frame.

3. In a vehicle having a frame, rear road wheels on opposite sides of said frame, a rear axle housing between said wheels and a torque tube extending forwardly from said axle housing, a bracket removably mounted upon said torque tube on the underneath side thereof a second bracket longitudinally aligned with said first mentioned bracket and removably mounted upon said rear axle housing, a pair of torsion springs extending longitudinally between said first and second brackets and having their forward ends anchored to said first brackets and their rearward ends pivotally mounted in said second brackets, arms carried by said torsion springs adjacent said second brackets and extending laterally outwardly toward said rear wheels, and means connecting said arms to said frame.

4. The structure of claim 3 which is further characterized in that said first bracket is bolted to the underneath side of said torque tube and said second bracket is bolted to the rearward side of said axle housing to permit assembly and removal of said brackets and torsion springs as a unit.

JOHN J. WHARAM.
JEROME J. FELTS.

REFERENCES CITED

The following references are of record in the file of this patent:

UNITED STATES PATENTS

| Number    | Name       | Date          |
|-----------|------------|---------------|
| 1,113,222 | Lansden    | Oct. 13, 1914 |
| 1,205,612 | Ford       | Nov. 21, 1916 |
| 2,130,431 | Rabe       | Sept. 20, 1938|
| 2,330,482 | Fageol     | Sept. 28, 1943|
| 2,404,794 | Fageol     | July 30, 1946 |
| 2,453,117 | Buckendale | Nov. 9, 1948  |

FOREIGN PATENTS

| Number  | Country     | Date          |
|---------|-------------|---------------|
| 187,287 | Switzerland | Jan. 16, 1937 |
| 212,962 | Switzerland | Apr. 1, 1941  |